United States Patent [19]

Karakawa

[11] Patent Number: 4,838,318
[45] Date of Patent: Jun. 13, 1989

[54] ELBOW COVER FOR AN ELBOW IN PIPEWORK

[75] Inventor: Kazuo Karakawa, Koga, Japan

[73] Assignee: Yamato Kogyo Kabushiki Kaisha, Ibaraki, Japan

[21] Appl. No.: 142,952

[22] Filed: Jan. 12, 1988

[30] Foreign Application Priority Data

Jan. 20, 1987 [JP] Japan .................................. 62-6612

[51] Int. Cl.[4] ............................................. F16L 11/12
[52] U.S. Cl. ..................................... 138/166; 138/110; 138/128; 138/169; 138/178; 138/149; 137/375
[58] Field of Search ................ 138/99, 110, 98, 103, 138/128, 156, 149, 166, 167, 177, 178; 137/375; 285/45; 428/192

[56] References Cited

U.S. PATENT DOCUMENTS

| | | | |
|---|---|---|---|
| 1,261,221 | 4/1918 | Dutcher | 138/99 |
| 3,495,629 | 2/1970 | Botsolas et al. | 138/178 |
| 3,960,181 | 6/1976 | Baur et al. | 138/178 |
| 4,426,108 | 1/1984 | Kesselman | 285/45 |
| 4,669,509 | 6/1987 | Botsolas | 138/110 |

Primary Examiner—James E. Bryant, III
Attorney, Agent, or Firm—Oblon, Fisher, Spivak, McClelland & Maier

[57] ABSTRACT

A plastics elbow cover (A) capable of being positively and securely mounted on an elbow section of piping. The elbow cover includes a tab (9, 10) extending from each of two sides of a cover section (8) which fits over the pipe. One of the tabs (9) includes: a tongue (9a) which engages a hole (10c) formed by a bridge (10d) on the other tab (10).

10 Claims, 3 Drawing Sheets

ELBOW COVER FOR AN ELBOW IN PIPEWORK

BACKGROUND OF THE INVENTION

1. Field of the Invention

The present invention relates to an elbow cover, and more particularly to an elbow cover for armouring piping for air conditioning or temperature control which is made not of sheet metal but of a plastics material by a method using a plastics forming mould.

2. Description of the Prior Art

In various kinds of pipings for air conditioning and temperature control such as heat insulation, cold insulation and the like, it is widely known to cover the piping by winding a suitable insulating material around the piping and then armouring the outside of the insulating material by fitting a cylindrical cover formed from a plastics sheet.

The cylindrical cover is suitable for being fitted to a straight portion of a piping. However, it cannot be used for armouring a corner portion or elbow of the piping. In view of the foregoing, it has been necessary to fit a plastics elbow cover to the elbow portion of the piping.

A known plastics elbow cover which has been extensively used for this purpose is shown in FIGS. 7 and 8 of the accompanying drawings. It is made of a plastics sheet such as, for example, a vinyl chloride sheet about 0.5 mm in thickness, and is formed into a shape such as that obtained by cutting along the inner side of a right angled piece of piping generally designated by reference character A' in FIG. 7.

As shown in FIG. 8, the so-constructed conventional plastics elbow cover A' is mounted on an elbow of piping 1. This is carried out by fitting a cylindrical cover 4 or the like over an insulating material 3 on the elbow portion 2 of the piping 1. The opposite edges 5 formed by cutting open the inner side of the elbow cover A' are separated from each other to form a gap therebetween to fit the elbow cover on the elbow and the edges are then closed so that they abut against or overlap each other. Thereafter, the two ends 6 of the cover A' are fixed on the piping 1 by means of a tape 7 such as a plastics adhesive tape, a metal film tape, a band tape or the like.

Thus, the operation of fittedly armouring the piping 1 with the conventional elbow cover A' requires the use of the tape 7 in addition to the elbow cover A'. Also, mounting the elbow cover A' on the piping 1 requires the operative to wind the tape 7 at both ends 6 with one hand while securely holding the elbow cover A' on the elbow of the piping 1 with the other hand in order to ensure that the edges 5 securely overlap each other, since the insulating material exhibits elasticity due to its being made of an elastic or resilient material such as felt or the like. This results in the operation being highly troublesome and requiring much labour and time, and the operative is required to be skilled.

A conventional elbow cover of a metal sheet such as a tin plate or the like is made by soldering a plurality of arcuate metal sheets together to form a quarter-spherical cover body and then attaching fan-shaped metal sheets to both sides of the cover body. Thus, the metal sheet elbow cover is quite different from the point of view of material, manufacturing process, and construction as compared to the plastics elbow cover. Also, the two variants tend to be applied to different objects. More specifically, the metal sheet elbow cover is usually fitted on an elbow formed by putting a cylindrical cover or a metal sheet on an insulating material wound on an elbow portion of piping.

SUMMARY OF THE INVENTION

The present invention has been made to overcome the foregoing disadvantages of the prior art.

It is an object of the present invention to provide a plastics elbow cover which is capable of eliminating the use of any tape in the elbow mounting operation.

It is another object of the present invention to provide a plastics elbow cover which is capable of being positively and securely mounted on an elbow portion of piping in a simple manner.

It is a further object of the present invention to provide a plastics elbow cover which is capable of exhibiting a good finished appearance.

According to the invention, there is provided an elbow cover for an elbow or curved section of piping, comprising: a housing section which, in its operative or closed condition, defines two openings interconnected by a curved or angled bore, the housing section being correspondingly curved thereby defining a radially outer region and a radially inner region, the radially inner region being split from one opening to the other when the housing section is in an inoperative or open condition, the housing section having a pair of tabs, one on each side of the split, the tabs including interengaging means whereby the tabs may be interengaged, thereby closing the split when the housing section is in its closed condition. Preferably the elbow cover is made from a plastics material.

The tabs are preferably integral with and form extensions of the housing section. Preferably, the tabs comprise fan-shaped sections, the first fan-shaped section including a first tongue at its free end formed with a first engagement portion, the second fan-shaped section including a second tongue at its free end formed with a second engagement portion.

The second engagement portion preferably comprises a hole arranged to receive captively the first tongue. The first engagement portion comprises projections formed on the upper surface of the first tongue. The engagement hole may be defined by a bridge on the second tongue.

The second engagement portion may comprise projections formed on the inner surface of the bridge so as to engage the projections on the first tongue. Alternatively the second engagement portion may comprise a resilient enegagement element arranged on the inner surface of the bridge so as to engage the first tongue. Preferably, in such a case, the resilient engagement element is formed on its lower surface with engagement projections and is fixed at one end on the inner surface of the bridge and is free at its other end.

The invention also extends to a method of manufacturing an elbow cover as described in accordance with the invention, by moulding in a plastics forming mould.

In accordance with another aspect of the present invention, a plastic elbow cover is provided which comprises a cover section and fan-shaped sections provided on both sides of the cover section so as to extend therefrom. One of the fan-shaped sections is provided at a tip end portion thereof with a tongue-like element which is formed with an engagement. The other fan-shaped section is provided at a tip end portion thereof with a tongue-like element which is formed with an engagement hole including an engagement member.

The tongue-like element of the one fan-shaped section is securely inserted in the engagement hole of the tongue-like element of the other fan-shaped section to prevent disengagement of the one fan-shaped section from the other fan-shaped section.

BRIEF DESCRIPTION OF THE DRAWINGS

Other objects and many of the attendant advantages of the present invention will be readily appreciated as the same becomes better understood by reference to the following detailed description when considered in connection with the accompanying drawings, wherein.

DESCRIPTION OF THE PREFERRED EMBODIMENTS

Figure 1A:
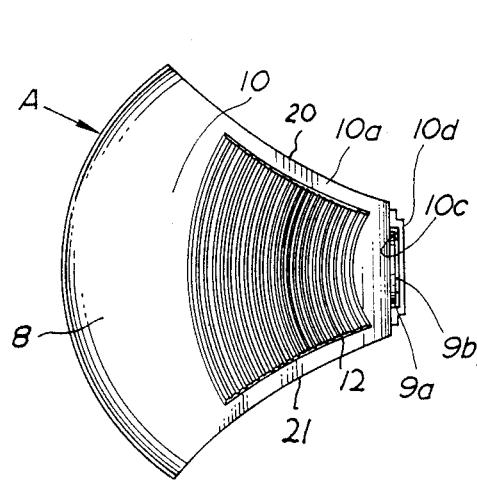
FIG. 1A is a side view of one embodiment of a plastics elbow cover according to the present invention in which the two tongue-like elements are engaged.
Figure 1B:
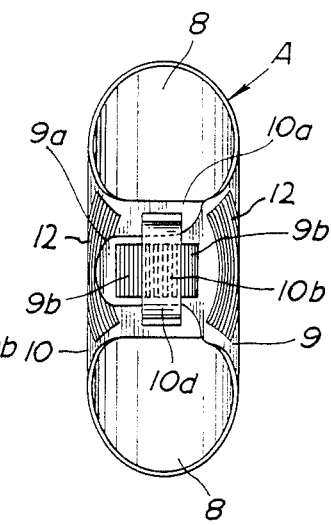
FIG. 1B is an end view of the plastics elbow cover shown in FIG. 1A.

The invention may be carried into practice in various ways and some embodiments will now be described with reference to FIGS. 1 to 6 of the accompanying drawings.

FIGS. 1 to 5 illustrate an embodiment of a plastics elbow cover according to the present invention. The elbow cover A includes a cover section 8 of a substantially quarter-spherical shape. The elbow cover A also includes fan-shaped sections 9 and 10 which extend inwards from both sides of the cover section 8 and each of which has a substantially completely concave end portion 20, 21. One of the fan-shaped sections 9 is provided at its end with a tongue-like element 9a which is formed with an engagement portion 9b. The other fan-shaped section 10 is also provided at its end with a tongue-like element 10a, which is formed with an engagement hole 10c including an engagement portion 10b. Also provided are a series of fine, arcuate reinforcing ribs 12 having successively increasing radii of curvature formed on an outer surface of the first and second fan-shaped sections 9, 10.

When the tongue-like element 9a is inserted into the engagement hole 10c of the tongue-like element 10a, the engagement portions 9b and 10b engage each other and prevent the tongue-like element 9a from being disengaged or removed from the engagement hole 10c.

In the illustrated embodiment, the engagement portion 9b of the tongue-like element 9a comprises engagement projections or ridges provided on the upper surface of the tongue-like element 9a and formed into a suitable shape such as a rack.

Figure 2:
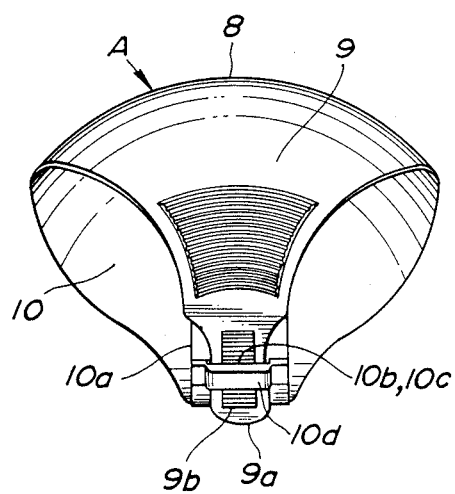
FIG. 2 is a perspective view of the plastics elbow cover shown in FIG. 1A.
Figure 3:
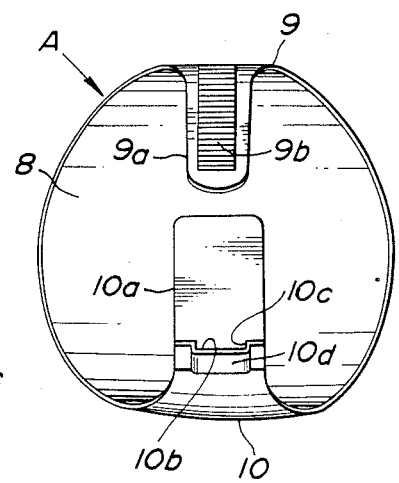
FIG. 3 is another end view of the plastics elbow cover shown in FIG. 1A but in which the two tongue-like elements are disengaged.
Figure 4:
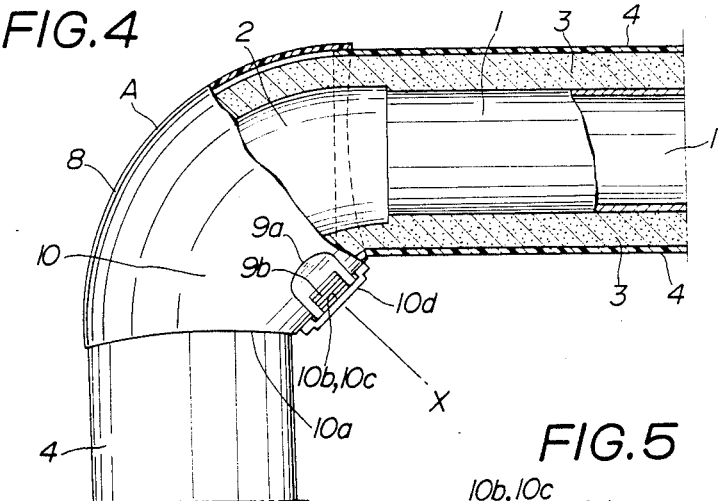
FIG. 4 is a side view partly in section of the plastics elbow cover shown in FIG. 1A, mounted on an elbow portion of piping.
Figure 5:
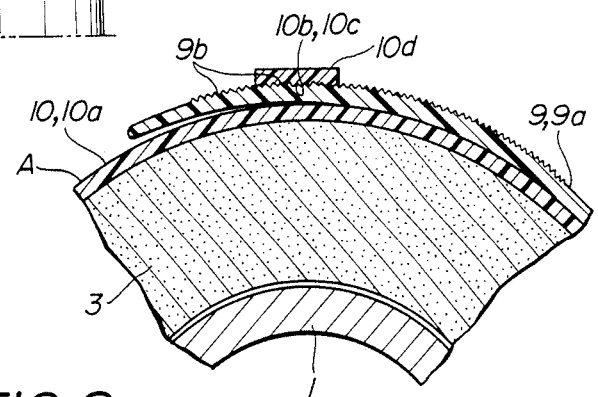
FIG. 5 is an enlarged sectional view taken along line X—X in FIG. 4.

The engagement portion 10b of the tongue-like element 10a, as shown in FIGS. 2 and 5, comprises engagement projections or ridges formed on the inner surface of a bridge plate of a bridge 10d. The bridge 10d is arranged on the upper surface of the tongue-like element 10a to define the engagement hole 10c which cooperates with the tongue-like element 10a, so that it may engage the engagement projections 9b of the tongue-like element 9a.

Figure 6:
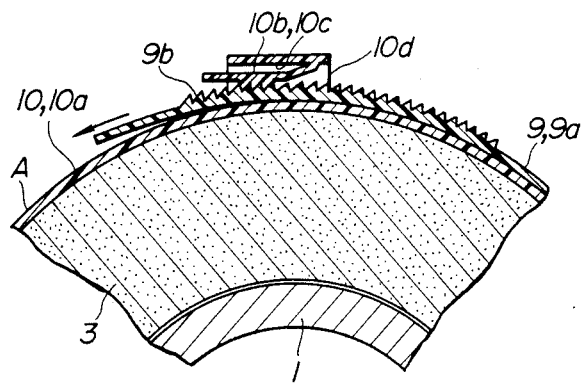
FIG. 6 is a view similar to FIG. 5 showing another embodiment of a plastics elbow cover according to the present invention.
Figure 7:
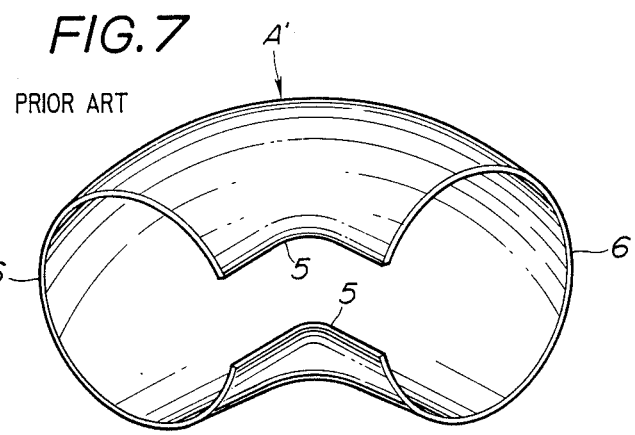
FIG. 7 is a perspective view of a conventional elbow cover.
Figure 8:
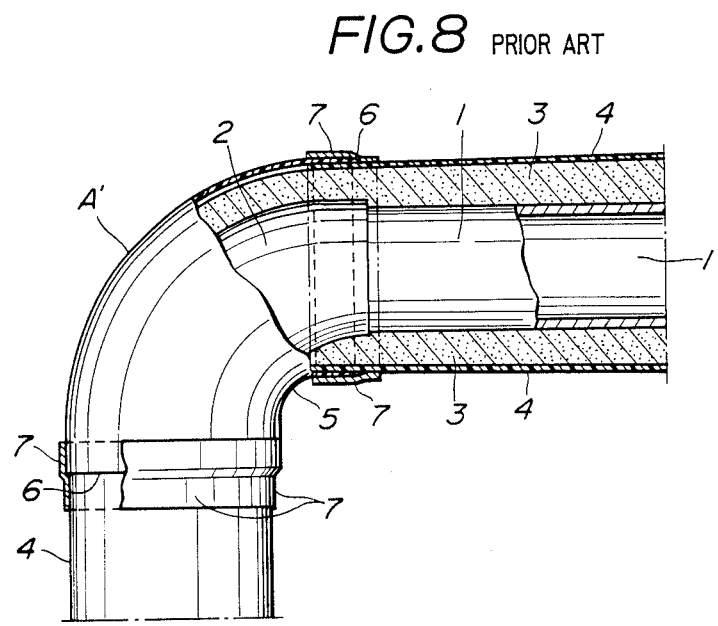
FIG. 8 is a side view partly in section of the conventional elbow cover shown in FIG. 7, mounted on an elbow portion of piping.

FIG. 6 shows another embodiment of a plastics elbow cover according to the present invention, which is so constructed that the engagement portion 10b of the tongue-like element 10a comprises a resilient engagement element on the inner surface of the bridge plate of the bridge 10d which is arranged on the tongue-like element 10a so as to define the engagement hole 10c in co-operation with the tongue-like element 10a. The resilient engagement element 10b has engagement projections on its lower surface which engage the engagement portion 9b of the tongue-like element 9a. The resilient engagement element 10b is fixed at one end on the inner surface of the engagement hole 10c or the bridge plate and is free at the other end, so that it may act like a leaf spring.

However, the engagements 9b and 10b are not limited to the constructions described and may take any form as long as they can prevent the tongue-like element 9a from being disengaged from the engagement hole 10c of the tongue-like element 10a.

The plastics elbow cover of the present invention is adapted to be formed by fabrication using a plastics forming mould. The so-formed plastics elbow cover may have a thickness as small as 0.5 to 1.0 mm.

The plastics elbow cover of the present invention, constructed as described above, is used in such a manner that the cover section 8 is fitted on an elbow portion of piping and then the fan-shaped sections 9 and 10 are wound round the elbow portion to insert the tongue-like element 9a into the engagement hole 10c of the tongue-like element 10a, while securely holding both tongue-like elements 9a and 10a. This results on the engagements 9b and 10b being securely interengaged, thereby preventing disengagement of the element 9b from the hole 10c.

Thus, the plastics elbow cover of the present invention is positively and securely mounted on an elbow portion of piping in a very simple manner.

As can be seen from the foregoing, the plastics elbow cover of the presnt invention is readily and effectively fitted on an elbow portion of piping because only one engagement operation, between the engagement portions of the two tongue-like elements, is essentially required. Also, the present invention presents an attractive finished appearance. Furthermore the present invention avoids any troublesome tape winding operation which is required in the prior art, resulting in operational efficiency being improved.

Moreover, the elbow cover of the present invention is made from a plastics material so that it may be rapidly manufactured with high accuracy by a single forming step and is suitable for mass production, resulting in a reduction in manufacturing costs.

Obviously, many modifications and variations of the present invention are possible in light of the above teachings. It is therefore to be understood that within the scope of the appended claims, the invention may be practiced otherwise than as specifically described.

What is claimed as new and desired to be secured by letters patent of the United States is:

1. An elbow cover for an elbow or curved section of piping, comprising: a housing section of substantially quarter-spherical shape which, in its operative or closed condition, defines two openings interconnected by a curved or angled bore, the housing section being correspondingly curved thereby defining a radially shaped outer region and a radially shaped inner region, the radically shaped inner region being split from one opening to the other when the housing section is in its inoperative or open condition, the housing section having a pair of tabs, one on each side of the split, the tabs including interengaging means such that the tabs may be interengaged, thereby closing the split when the housing section is in its closed condition wherein the tabs comprise first and second fan-shaped sections, the first fan-shaped section including a first tongue having a first engagement portion formed at a free end of said first tongue, the second fan-shaped section including a second tongue formed with a second engagement portion at a free end of said second tongue, and wherein said first and second fan shaped sections have, as viewed exteriorly, substantially completely concave first and second end portions, respectively, the first and second fan-shaped sections each having a series of arcuate reinforcing ribs formed on an outer surface thereof having successively increasing radii of curvature.

2. An elbow cover as claimed in claim 1 which is made from a plastics material.

3. An elbow cover as claimed in claim 1 in which the tabs are integral with and form extensions of the housing section.

4. An elbow cover as claimed in claim 1 in which the second engagement portion comprises a hole arranged to receive captively the first tongue.

5. An elbow cover as claimed in claim 4 in which the first engagement portion comprises projections formed on the upper surface of the first tongue.

6. An elbow cover as claimed in claim 5 in which the engagement hole is defined by a bridge on the second tongue.

7. An elbow cover as claimed in claim 6 in which the second engagement portion comprises projections formed on the inner surface of the bridge so as to engage the projection on the first tongue.

8. An elbow cover as claimed in claim 6 in which the second engagement portion comprises a resilient engagement element arranged on the inner surface of the bridge so as to engage the first tongue.

9. An elbow cover as claimed in claim 8 in which the resilient engagement element is formed on its lower surface with engagement projections and is fixed at one end on the inner surface of the bridge and is free at its other end.

10. A plastic elbow cover comprising: a cover section of substantially quarter-spherical shape, and radial fan-shaped sections formed on both sides of the cover section so as to extend therefrom; one of the fan-shaped sections being provided at a tip end portion thereof with a tongue-like element, the tongue-like element being formed with an engagement; the other fan-shaped section being provided at a tip end portion thereof with a tongue-like element, the tongue-like element being formed with an engagement hole including an engagement member; the tongue-like element of the one radial fan-shaped section being securely inserted in the engagement hole of the tongue-like element of the other radial fan-shaped section to prevent disengagement of said one radial fan-shaped section from said other radial fan-shaped section wherein said first and second fan shaped sections have, as viewed exteriorly, substantially completely concave first and second end portions, respectively, the first and second fan-shaped sections each having a series of arcuate reinforcing ribs formed on an outer surface thereof having successively increasing radii of curvature.

* * * * *